US010457308B2

(12) United States Patent
Liao

(10) Patent No.: US 10,457,308 B2
(45) Date of Patent: Oct. 29, 2019

(54) CART

(71) Applicant: UNIQUE PRODUCT & DESIGN CO., LTD., Tainan (TW)

(72) Inventor: Gordon Liao, Tainan (TW)

(73) Assignee: UNIQUE PRODUCT & DESIGN CO., LTD., Yong Kang District, Tainan (TW)

( * ) Notice: Subject to any disclaimer, the term of this patent is extended or adjusted under 35 U.S.C. 154(b) by 0 days.

(21) Appl. No.: 16/083,350

(22) PCT Filed: Mar. 29, 2017

(86) PCT No.: PCT/AT2017/060078
§ 371 (c)(1),
(2) Date: Sep. 7, 2018

(87) PCT Pub. No.: WO2017/165901
PCT Pub. Date: Oct. 5, 2017

(65) Prior Publication Data
US 2019/0100227 A1 Apr. 4, 2019

(30) Foreign Application Priority Data
Mar. 29, 2016 (AT) .................. 50257/2016

(51) Int. Cl.
*B62B 3/02* (2006.01)
*B62B 5/06* (2006.01)
(Continued)

(52) U.S. Cl.
CPC ............. *B62B 3/022* (2013.01); *A63B 55/60* (2015.10); *B62B 5/067* (2013.01); *B62B 7/068* (2013.01);
(Continued)

(58) Field of Classification Search
CPC ......... B62B 3/022; B62B 5/067; B62B 7/068; B62B 2205/12; B62B 2202/404; A63B 55/60
See application file for complete search history.

(56) References Cited

U.S. PATENT DOCUMENTS 6,695,324 B1 * 2/2004 Wu .................... B62B 1/045
280/47.315
7,137,644 B2 * 11/2006 Kimberley ............... B62B 3/12
280/651
(Continued)

FOREIGN PATENT DOCUMENTS

CN 204337672 U 5/2015
CN 105151105 A 12/2015
(Continued)

Primary Examiner — Jacob B Meyer
(74) Attorney, Agent, or Firm — Muncy, Geissler, Olds & Lowe, P.C.

(57) ABSTRACT

A cart includes a bottom frame having a first transverse frame member and a longitudinal frame member, first and second back wheels, a first front wheel, a carrier frame, a collapsing mechanism, and a folding mechanism. First and second back wheel holders pivotably connect the first and second back wheels to opposite ends of the first transverse frame member, respectively. A first slide block slides along the longitudinal frame member. First and second guide units connect the first slide block to the first and second back wheel holder. A connecting member connects the carrier frame to the first slide block. A first front wheel holder pivotably connects the first front wheel to the bottom frame. A third guide unit guides the first front wheel holder. A longitudinal connecting arm connects the first slide block to the third guide unit for the first front wheel holder.

19 Claims, 9 Drawing Sheets

(51) Int. Cl.
 *A63B 55/60* (2015.01)
 *B62B 7/06* (2006.01)
(52) U.S. Cl.
 CPC ..... *B62B 2202/404* (2013.01); *B62B 2205/12* (2013.01)

(56) References Cited

U.S. PATENT DOCUMENTS

| | | | | |
|---|---|---|---|---|
| 7,866,685 | B2* | 1/2011 | Liao | B62B 3/12 280/651 |
| 8,191,920 | B2* | 6/2012 | Zhang | B62B 3/02 280/47.26 |
| 8,439,390 | B2* | 5/2013 | Zhang | B62B 3/02 280/47.34 |
| 8,500,140 | B1* | 8/2013 | Liao | B62B 7/10 280/38 |
| 8,544,871 | B1* | 10/2013 | Liao | B62B 3/02 280/62 |
| 8,585,076 | B2* | 11/2013 | Thorne | B62B 7/068 280/650 |
| 8,720,912 | B2* | 5/2014 | Liao | B62B 3/12 280/47.24 |
| 8,820,775 | B2* | 9/2014 | Wang | B62B 5/0433 280/651 |
| 8,894,091 | B2* | 11/2014 | Thorne | B62B 7/068 280/650 |
| 9,079,598 | B1* | 7/2015 | Oreyang | B62B 3/022 |
| 9,346,478 | B2* | 5/2016 | Kimberley | B62B 5/0433 |
| 9,381,931 | B1* | 7/2016 | Pan | B62B 3/106 |
| RE46,150 | E* | 9/2016 | Liao | B62B 3/02 |
| 9,731,745 | B2* | 8/2017 | Thorne | B62B 7/068 |
| 9,764,752 | B2* | 9/2017 | Liao | B62B 3/025 |
| 9,764,754 | B2* | 9/2017 | Zhang | B62B 3/02 |
| 2008/0211206 | A1* | 9/2008 | Thorne | B62B 7/068 280/650 |
| 2010/0052275 | A1* | 3/2010 | Reimers | B62B 3/022 280/47.26 |
| 2011/0074134 | A1* | 3/2011 | Wang | B62B 3/02 280/646 |
| 2011/0181027 | A1* | 7/2011 | Zhang | B62B 3/02 280/651 |
| 2011/0215542 | A1* | 9/2011 | Wang | B62B 3/02 280/35 |
| 2011/0215553 | A1* | 9/2011 | Thorne | B62B 7/068 280/650 |
| 2011/0218712 | A1* | 9/2011 | Thorne | B62B 7/068 701/49 |
| 2011/0248478 | A1* | 10/2011 | Thorne | B62B 7/068 280/650 |
| 2011/0248840 | A1* | 10/2011 | Thorne | B62B 7/068 340/425.5 |
| 2011/0285111 | A1 | 11/2011 | Liao | |
| 2012/0261908 | A1* | 10/2012 | Liao | B62B 3/12 280/651 |
| 2016/0176427 | A1* | 6/2016 | Liao | B62B 3/025 280/642 |
| 2017/0327140 | A1* | 11/2017 | Liao | B62B 3/025 |
| 2019/0100227 | A1* | 4/2019 | Liao | A63B 55/60 |

FOREIGN PATENT DOCUMENTS

| | | |
|---|---|---|
| DE | 202015008876 U1 | 1/2016 |
| GB | 2474733 A | 4/2011 |
| GB | 2513930 A | 11/2014 |
| WO | WO 2010/022216 A2 | 2/2010 |
| WO | WO 2012/094955 A1 | 7/2012 |
| WO | WO 2015/018898 A1 | 2/2015 |

\* cited by examiner

CART

BACKGROUND OF THE INVENTION

Field of the Invention

The invention relates to a cart, in particular a golf trolley, comprising a bottom frame, the bottom frame having a first transverse frame member and a longitudinal frame member, a first and a second back wheel, the first and second back wheel being connected to opposite ends of the first transverse frame member, a first front wheel mounted to the bottom frame, a carrier frame mounted to the bottom frame, a collapsing mechanism for bringing the carrier frame from a carrying position into a collapsed position, and a folding mechanism for folding the first and second back wheel and the first front wheel from a drive position into a stow position, the folding mechanism having a first and a second back wheel holder pivotably connecting the first and the second back wheel to the opposite ends of the first transverse frame member, respectively, the folding mechanism further having a first slide block for sliding along the longitudinal frame member, a first guide unit connecting the first slide block to the first back wheel holder and a second guide unit connecting the first slide block to the second back wheel holder, the folding mechanism further having a connecting member connecting the carrier frame to the first slide block, the folding mechanism further having a first front wheel holder, the first front wheel holder pivotably connecting the first front wheel to the bottom frame, the folding mechanism further having a third guide unit for guiding the first front wheel holder.

Description of the Related Art

In the prior art, a large number of manually operated carts, like golf caddies, exist which may be folded into a compact position when not in use. For example, WO 2015/018898 A1 discloses a three-wheeled transport carriage for a golf bag with a first elongated frame part and a second elongated frame part which can be pivoted relative to one another. On the front end of the second frame part a front wheel is pivotally attached via a wheel holding bracket. Two rear wheels are hinged to a cross-member in the region between the first and second frame part. The known folding mechanism further comprises guide arms between the bearings of the back wheels and the frame. It is a drawback of this prior art that the back and front wheels have to be stowed separately.

In CN 204337672 U golf caddie is proposed having separate folding mechanisms for the back wheels and the front wheel. The back wheel folding mechanism is arranged for folding the back wheels flat to the frame when an upper frame is pivoted downwards to a lower frame. For this purpose, a first guide arm connects the upper frame to the lower frame. A second guide arm connects the slide block to the back wheels. In this way, pivoting the upper frame makes slide block slide along lower frame, such that second guide arm pulls the back wheels inwards. However, in this prior art the front wheel has to be stowed separately, too.

US 2011/0285111 A1 (and, similarly, GB 2,474,733 A) discloses a different type of three-wheeled foldable golf bag cart comprising a bottom cart stand, an upper cart stand and a bag base. The upper cart stand is pivotably connected to one end of the bottom cart stand, while the bag base is pivotably connected to the other end of the bottom cart stand. For stowing the cart, the upper cart stand and the bag base are folded towards the upper side of the bottom cart stand, which moves the back wheels forward and the front wheel upwards. Neither the back wheels nor the front wheel are folded flat in this prior art.

WO 2012/094955 A1 discloses another trolley with a folding mechanism that merely involves bringing back wheels closer to a center frame while pivoting front wheels upwards.

WO 2010/022216 A2 shows a different kind of golf bag cart with a conventional stowing mechanism having a slider block driven by upper frame tubes. The slider block, on its underside, is connected via rods to arms carrying wheels. When transferred from a use position to a stowing position, the wheels can be pulled closer to base tubes of the frame.

BRIEF SUMMARY OF THE INVENTION

The object of the present invention is to alleviate at least some of the drawbacks of the prior art. It is thus an object of the invention to provide a cart as mentioned initially with a simple, reliable folding mechanism that facilitates the stowing of the back and front wheels when the cart is not in use. According to the invention, the folding mechanism further comprises a longitudinal connecting arm connecting the first slide block to the third guide unit for the first front wheel holder.

Thus, in the invention the carrier frame is movable from a carrying position, in which the carrier frame projects upwards from the bottom frame, to the collapsed position, in which the frame is arranged adjacent the bottom frame. The movement of the carrier frame is transferred to the connecting member, which moves the first slide block along the longitudinal frame member of the bottom frame. The sliding motion of the first slide block is transferred to the first and second guide unit, respectively, which are arranged for folding first back wheel holder with first back wheel and second back wheel holder with second back wheel, respectively, inwards. Preferably, the back wheels pivot by an angle of approximately 90 degrees between the drive and stow position about axes essentially parallel to a longitudinal axis of the cart (which is the direction of a straight movement of the cart in the drive position). In the stow position, first and second back wheel are preferably arranged essentially in parallel to the main plain of the bottom frame. In the invention, the sliding motion of the first slide block is further transferred to the third guide unit for the first front wheel holder via the longitudinal connecting arm such that the first and the second back wheel as well as the first front wheel are simultaneously folded into the stow position by moving the carrier frame from the carrying position (i.e. the use position) into the collapsed position (i.e. the non-use position). Preferably, the third guide unit is arranged for pivoting the first front wheel holder with the first front wheel by an angle of approximately 90 degrees between the drive and stow position about an axis essentially parallel to the longitudinal axis of the cart. The folding mechanism provided by the invention is particularly simple, stable and light-weight. In particular, the stowing of the back and front wheels may be accelerated. This collapsing and folding mechanism is preferably applied to a golf caddie, which may have at least a first receiving element at the carrier frame for attaching a golf bag. A second receiving element may be arranged at the bottom frame. Furthermore, a handle for pushing of pulling the golf caddie may be connected to the carrier frame.

For the purpose of this disclosure, any reference to positions or directions is made with respect to the arrangement of the cart in normal use with the back and front wheels in contact with a horizontal underground.

In a preferred embodiment, the first front wheel and a second front wheel are connected to opposite ends of a second transverse frame member, the folding mechanism comprising a second front wheel holder, the first and the second front wheel holder pivotably connecting the first and the second front wheel to opposite ends of the second transverse frame member, respectively, the folding mechanism further comprising a fourth guide unit for guiding the second front wheel holder, the longitudinal connecting arm connecting the first slide block to the third and fourth guide unit, respectively.

In this embodiment, the cart has a first and a second front wheel. The first and second front wheel is mounted on first and second front wheel holder, respectively, which are pivotably mounted on opposite ends of second or front transverse frame member. Preferably, each of the first and the second front wheel holder is pivotable about an essentially horizontal axis extending in the longitudinal direction of the cart. In the stow position, the first and the second back wheel as well as the first and the second front wheel are arranged essentially horizontally at the underside of the bottom frame. When transferring the carrier or top frame from the carrying position to the collapsed position, the connecting member moves first slide block forward. The movement of first slide block, which is preferably linear, is transferred to the first and second guide unit for guiding the first and second back wheel holder from the drive position to the stow position, respectively. At the same time, the first slide block moves the longitudinal connecting arm forward, preferably essentially in direction of the longitudinal frame member. The movement of the longitudinal connecting arm with respect to the bottom frame is transferred to third and fourth guide unit for guiding the pivoting of the first and second front wheel from the drive position to the stow position. In this way, moving the carrier frame from the carrying position, in which the carrier frame may hold a golf bag, to the collapsed position, in which the carrier frame is stowed at the bottom frame, simultaneously folds the back and front wheels inwards. Thus, arranging the cart in a compact transport position is made particularly simple and fast. In particular, it is not required to stow back and front wheels separately.

In a preferred embodiment, the longitudinal connecting arm of the folding mechanism is arranged essentially in parallel to the longitudinal frame member, preferably at the underside thereof, the connecting arm preferably being moveable essentially length-wise relative to the longitudinal frame member. This construction is particularly simple, light-weight and provides for an easy operation. Preferably, the longitudinal connecting arm is immovably connected to first slide block such that linear movement of the slide block along the longitudinal frame member results in an equivalent linear movement of the longitudinal connection arm with respect to the longitudinal frame member. The longitudinal connecting arm connects to first and second front wheel holder via third and fourth guide unit. In view of an efficient force transfer, it is preferred if the longitudinal connecting arm is essentially rectilinear, the longitudinal axis thereof preferably being essentially parallel to the longitudinal axis of the longitudinal frame member. For obtaining a light-weight construction, the longitudinal connecting arm may be a hollow profile member.

In a preferred embodiment, the first guide unit comprises a second slide block for sliding along a first section of the first transverse frame member, the second guide unit comprising a third slide block for sliding along a second section of the first transverse frame member. Thus, in this embodiment the longitudinal motion of first slide block is transferred to transverse motions of second and third slide block, respectively. The third and fourth guide unit is further arranged for converting the transverse motions of second and third slide block into pivoting motions of first and second back wheel holder, respectively.

For the purpose of converting the longitudinal motion of the first slide block into the transverse motion of the second and third slide block, respectively, it is preferred if the first guide unit comprises a first pivot arm connecting the first slide block at the longitudinal frame member to the second slide block at the first transverse frame member, the second guide unit comprising a second pivot arm connecting the first slide block at the longitudinal frame member to the third slide block at the first transverse frame member. Preferably, opposite ends of first and second pivot arm are pivotably connected to first slide block and second or third slide block, respectively. The pivot axes of first and second pivot arm preferably extend essentially vertically, respectively.

For the purpose of converting the transverse motion of the second and third slide block into the pivoting motion of the first and second back wheel holder, respectively, it is preferred if the first guide unit comprises a first swivel arm connecting the second slide block to the first back wheel holder, the second guide unit comprising a second swivel arm connecting the third slide block to the second back wheel holder. The pivot axes of first and second swivel arm preferably extend essentially horizontally in longitudinal direction, respectively.

In a preferred embodiment, the third guide unit comprises a fourth slide block for sliding along a first section of the second transverse frame member, the fourth guide unit comprising a fifth slide block for sliding along a second section of the second transverse frame member. Preferably, the function and arrangement of fourth and fifth slide block on the second or front transverse frame member is equivalent to the second and third slide block on the first or rear transverse frame member, respectively.

In a preferred embodiment, the third guide unit comprises a third pivot arm connecting a mount at the longitudinal connecting arm to the fourth slide block at the second transverse frame member, the fourth guide unit comprising a fourth pivot arm connecting the mount at the longitudinal connecting arm to the fifth slide block at the second transverse frame member, the function and arrangement of third and fourth pivot arm is equivalent to the first and second pivot arm, respectively.

In a preferred embodiment, the third guide unit comprises a third swivel arm connecting the fourth slide block to the first front wheel holder, the fourth guide unit comprising a fourth swivel arm connecting the fifth slide block to the second front wheel holder. Preferably, the function and arrangement of third and fourth swivel arm is equivalent to the first and second swivel arm, respectively.

In a preferred embodiment, at least one of the first, second, third or fourth pivot arm is essentially U-shaped. In plan view, preferably all of first, second, third and fourth pivot arms are essentially U-shaped. This construction facilitates the transfer of the sliding motion of the first slide block In a preferred embodiment, the connecting member comprises a rotary arm, opposite ends of the rotary arm being pivotably connected to the carrier frame and the first slide block, respectively. The pivot axes of the rotary arm preferably extend essentially horizontally, in transverse direction.

In a preferred embodiment, a sleeve member with an opening for passing the longitudinal connecting arm therethrough is mounted on the bottom frame, preferably adjacent the second transverse frame member. By means of the sleeve member, the longitudinal connecting arm is guided in its movement when the folding mechanism is activated.

In a preferred embodiment, the carrier frame comprises a longitudinal carrier frame member, the longitudinal carrier frame member being pivotable about a transverse pivot axis between the carrying position and the collapsed position. In the carrying position, the longitudinal carrier frame member preferably extends essentially vertically upwards from the bottom frame.

In a preferred embodiment, a handle, in particular a push handle, is pivotably connected to the longitudinal carrier frame member.

BRIEF DESCRIPTION OF THE SEVERAL VIEWS OF THE DRAWINGS

By way of example, the invention is further explained with respect to a preferred embodiment shown in the drawings.

DETAILED DESCRIPTION OF THE INVENTION

Figure 1:
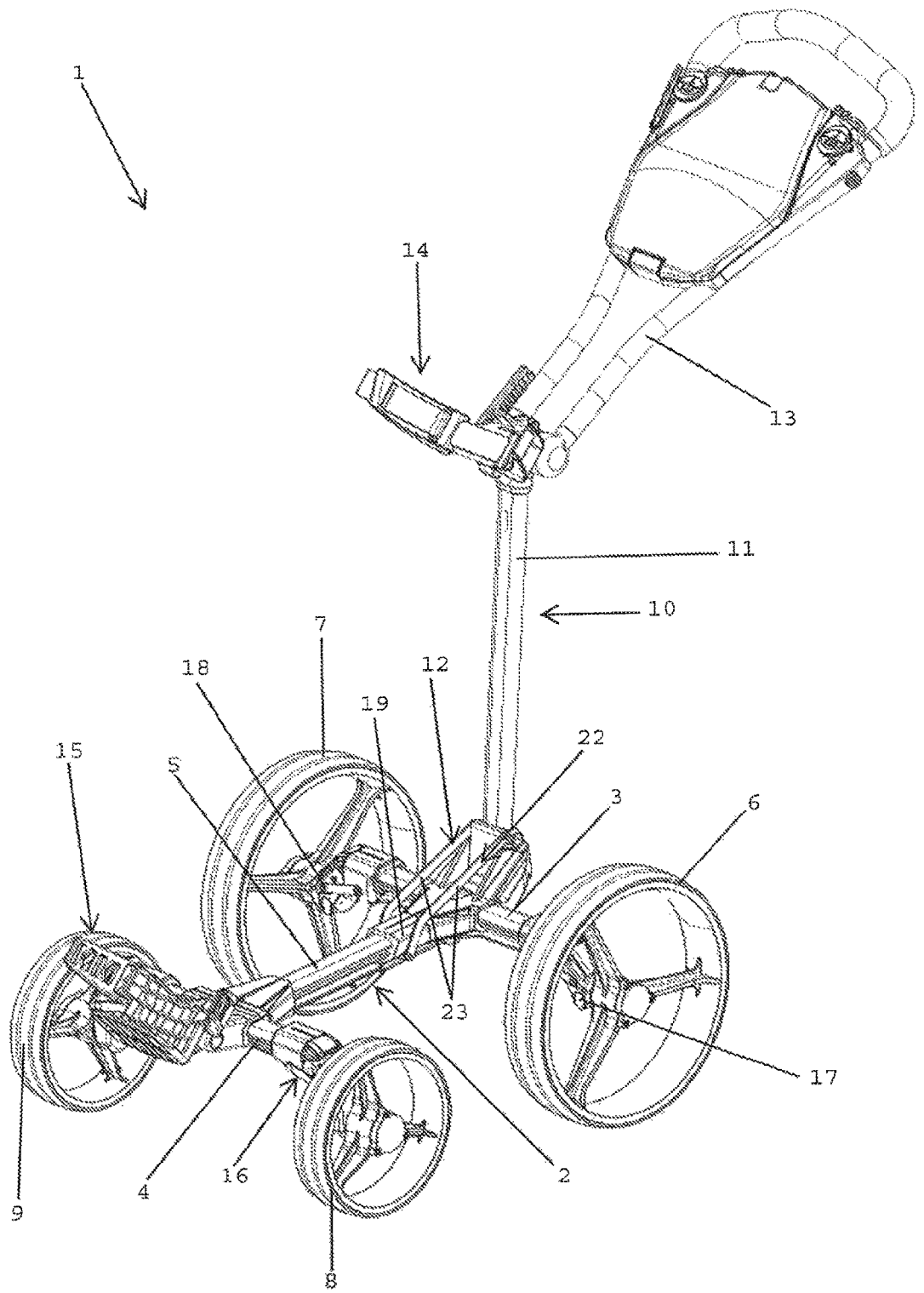
FIGS. 1 to 9 show a golf caddie according to the invention in a variety of views from different perspectives, both in use arranged for carrying a golf bag and in non-use position for transport.
Figure 2:
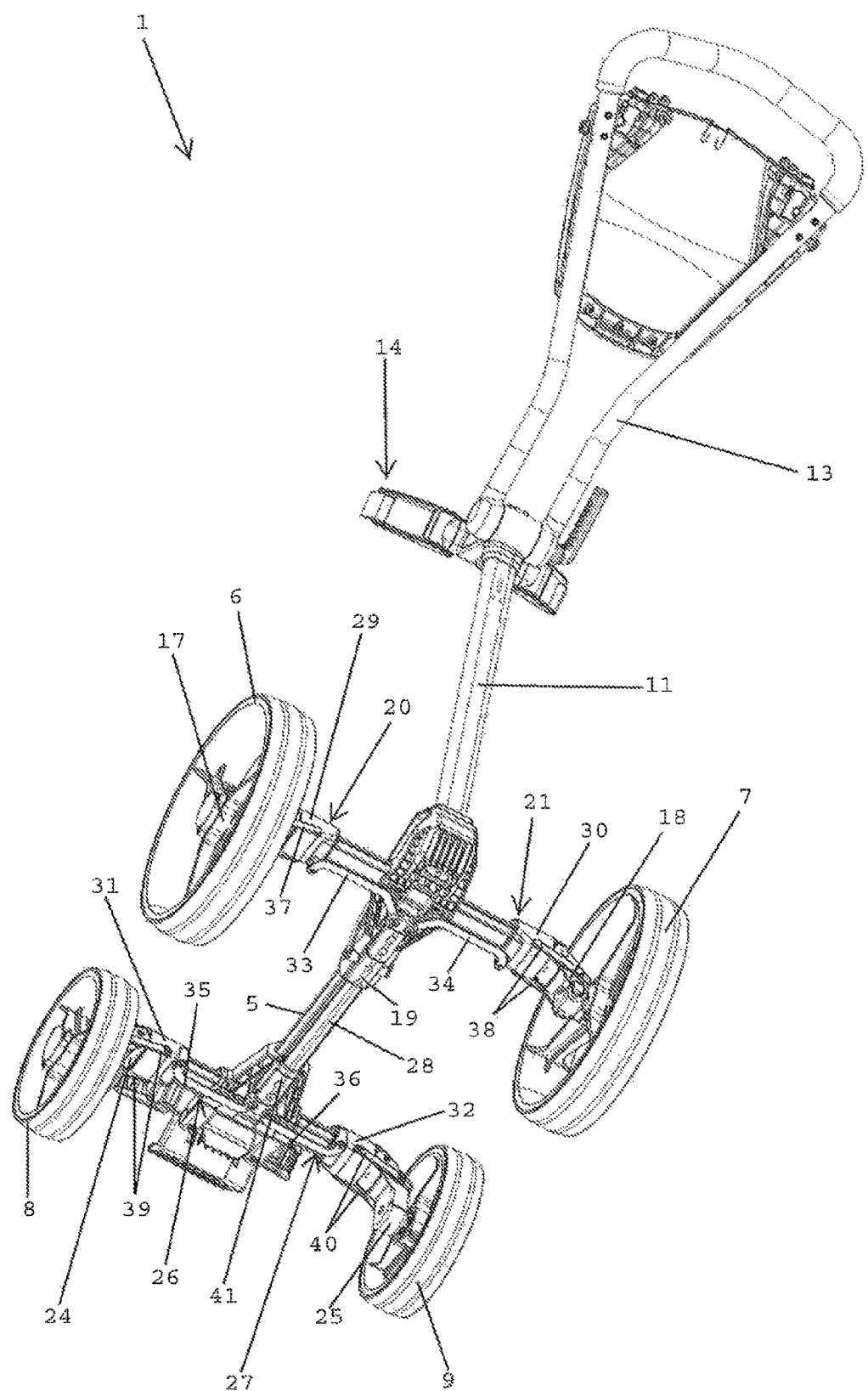
Figure 3:
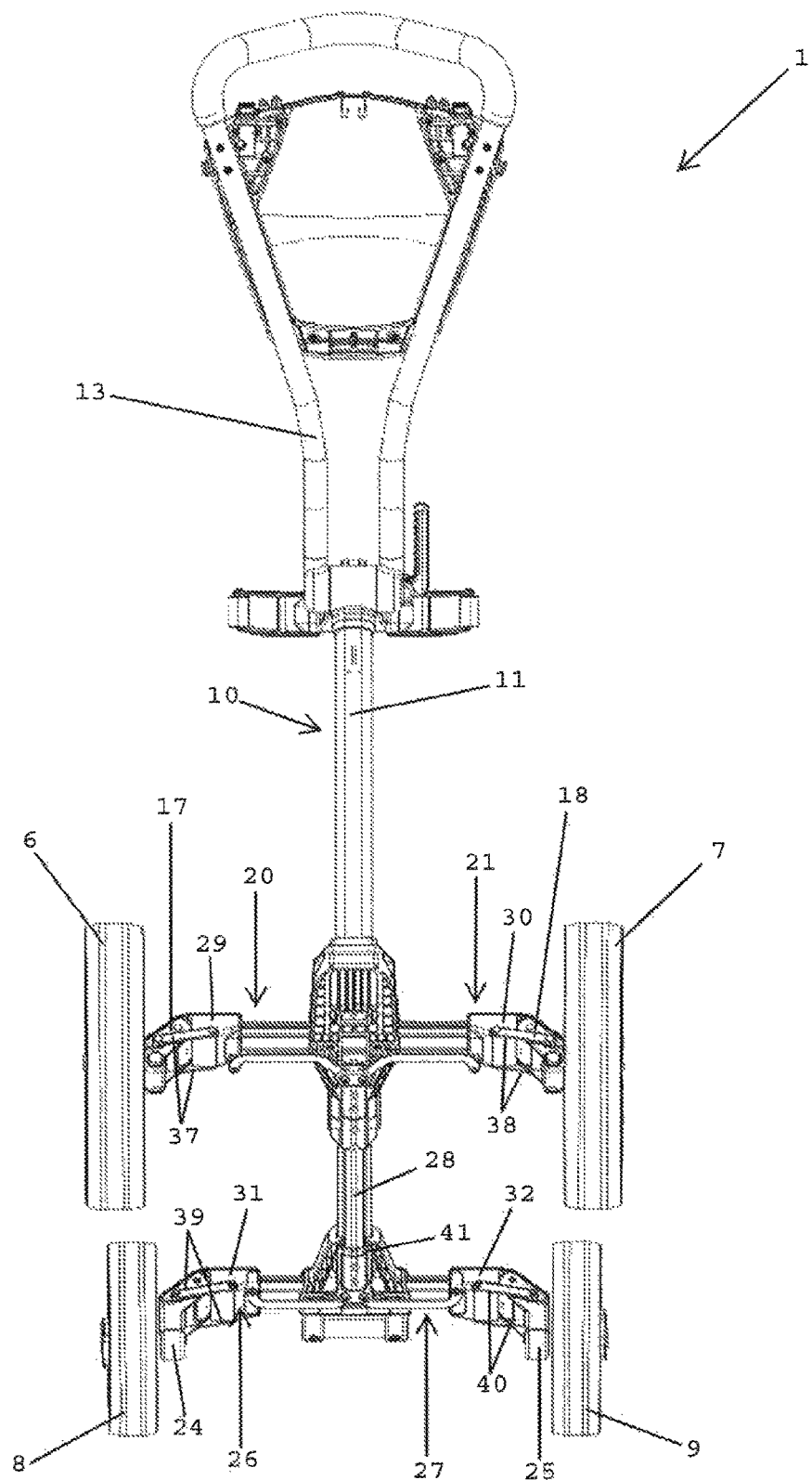

The figures depict a cart 1, which, in the shown embodiment, is a push golf trolley. Cart 1 comprises a bottom frame 2 defining an essentially horizontal main plane. Bottom frame 2 has a first or rear transverse frame member 3 and a second or front transverse frame member 4. A longitudinal frame member 5 connects first frame element 2 to second frame element 3. Cart 1 further comprises a first back wheel 6 and a second back wheel 7. First back wheel 6 and second back wheel 7 are connected to opposite ends of first transverse frame member 3. Cart 1 further comprises a first front wheel 8 and a second front wheel 9. First front wheel 8 and second front wheel 9 are connected to opposite ends of second transverse frame member 4.

Figure 7:
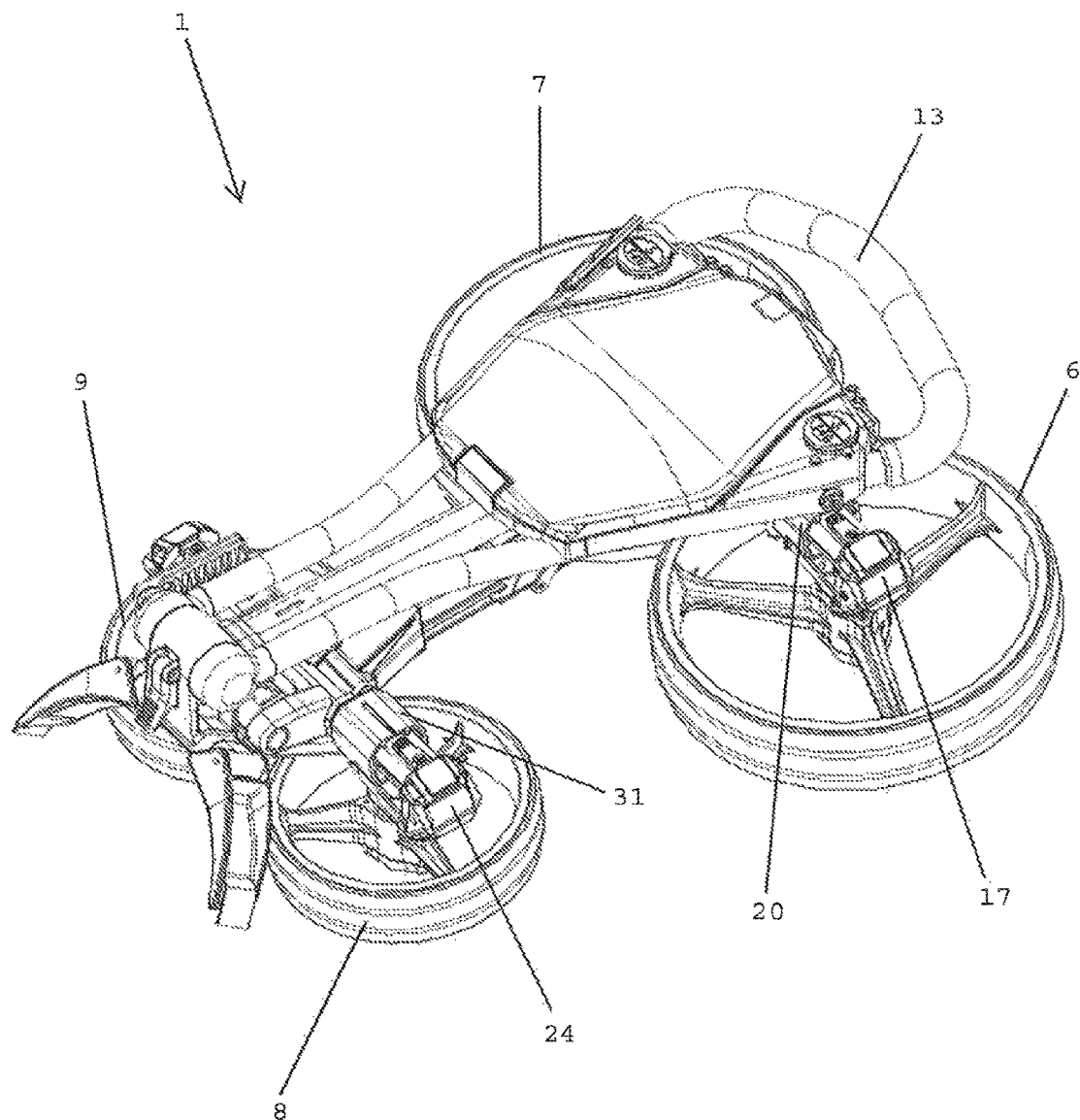
Figure 8:
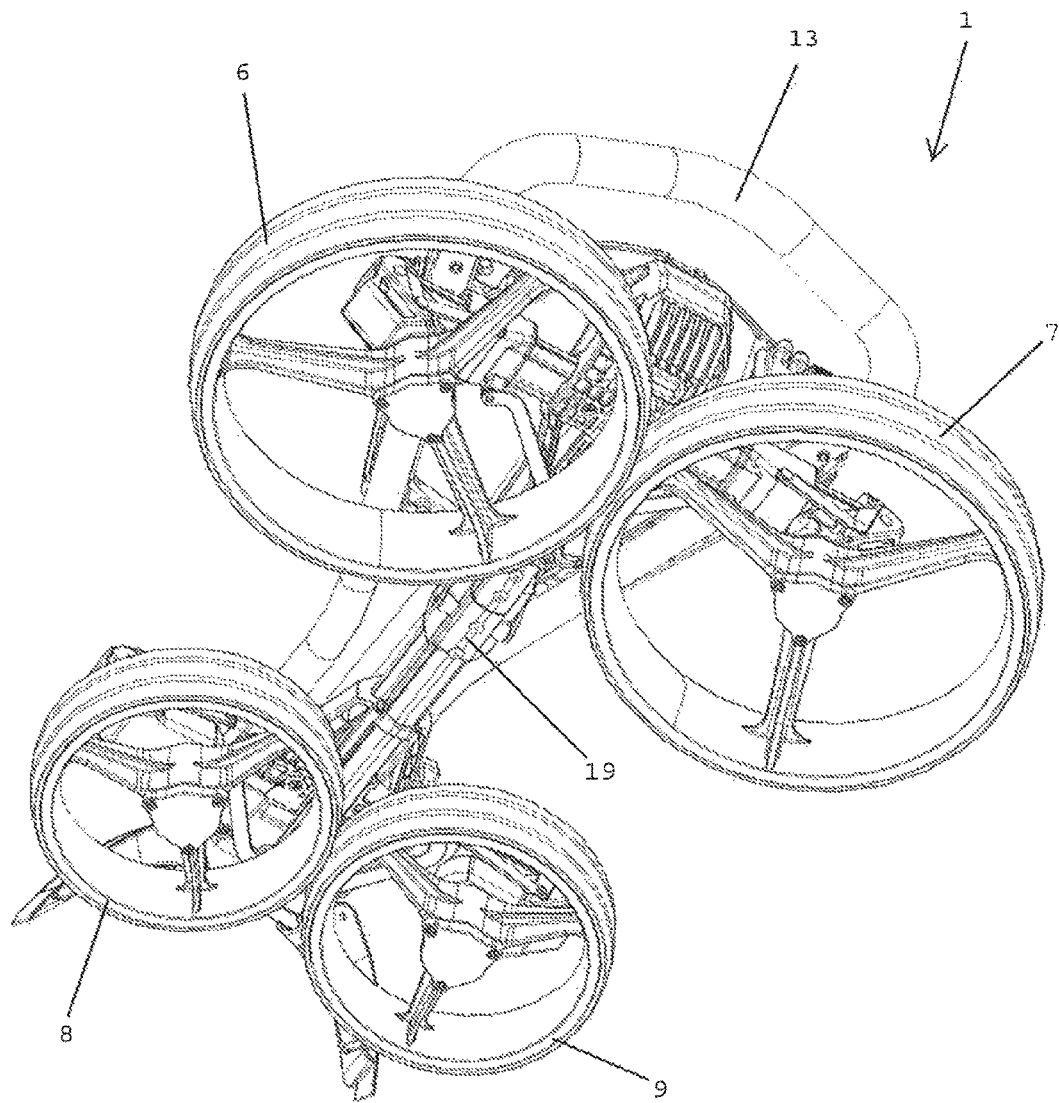
Figure 9:
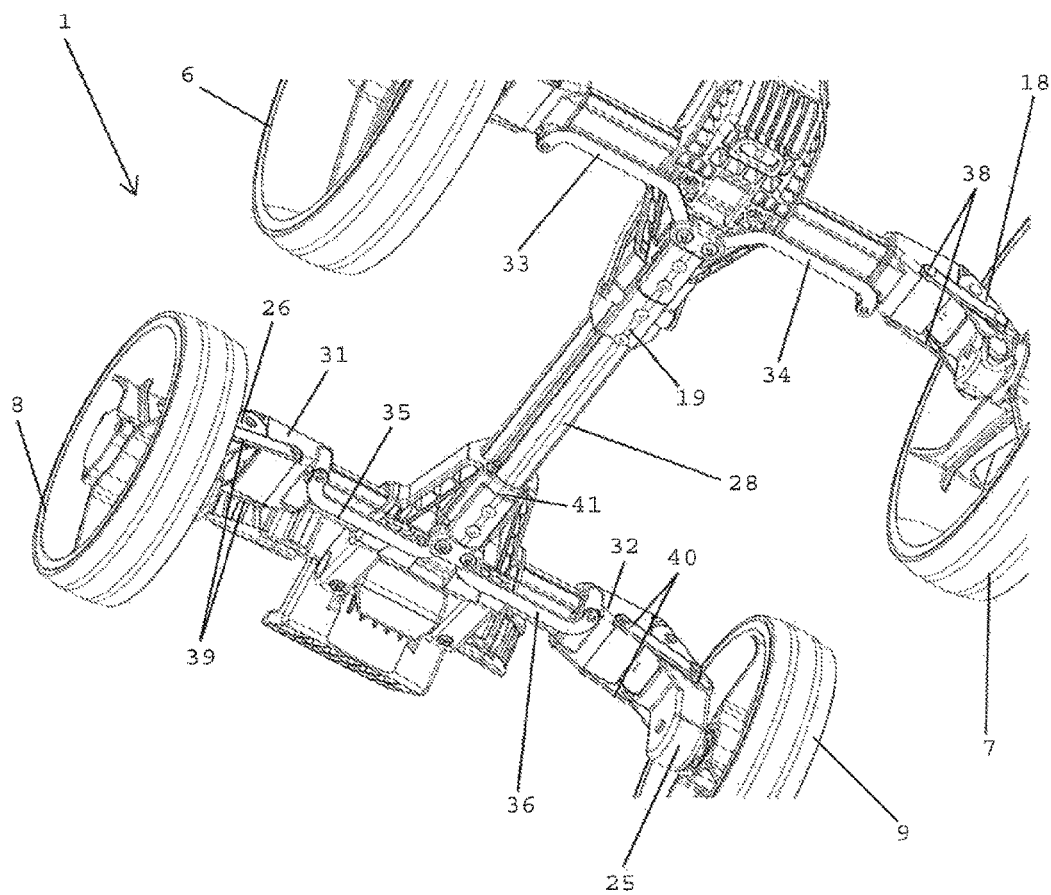

In the shown embodiment, cart 1 further comprises a carrier frame 10 mounted to the bottom frame 2. Carrier frame 10 comprises a longitudinal carrier frame member 11. A collapsing mechanism 12 is provided for bringing the carrier frame 10 from a carrying position (see FIGS. 1 to 3, 9) into a collapsed position (see FIGS. 7, 8) through a series of intermediary positions (see FIGS. 4 to 6). Longitudinal carrier frame member 11 is pivotable about a horizontal, transverse pivot axis between the carrying position and the collapsed position. In the carrying position, longitudinal carrier frame member 11 extends essentially vertically. In the collapsed position, longitudinal carrier frame member 11 extends essentially horizontally adjacent bottom frame 2. A push handle 13 is pivotably connected to longitudinal carrier frame member 11. In the collapsed position, push handle 13 is folded onto longitudinal carrier frame member 11 at the upper side of bottom frame 2. Furthermore, a first receiving element 14 is connected to the upper end of longitudinal frame member 11 and a second receiving element 15 is connected to the front end of bottom frame 2. In the shown embodiment, first and second receiving elements 14, 15 are arranged for holding a golf bag (not shown).

Figure 4:
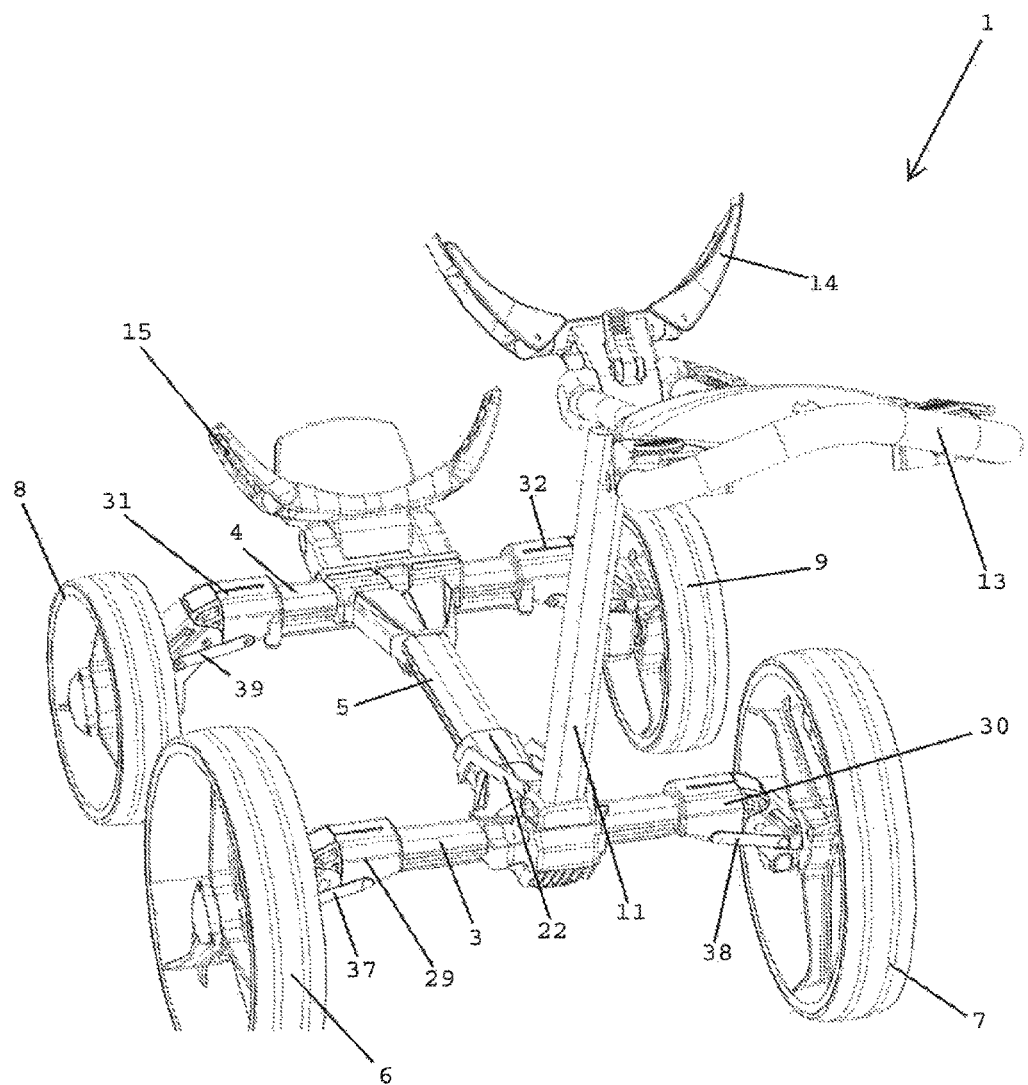
Figure 5:
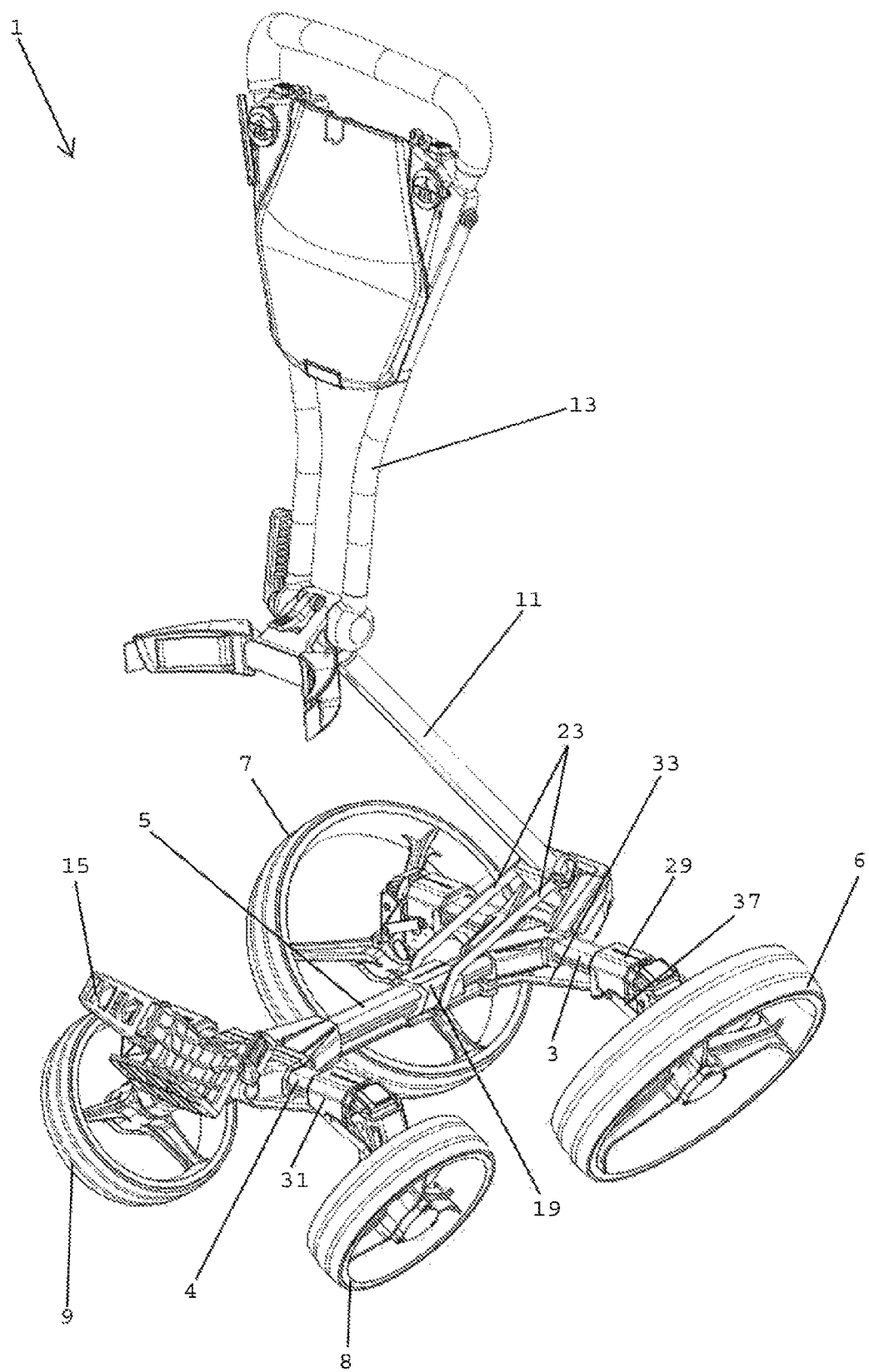
Figure 6:
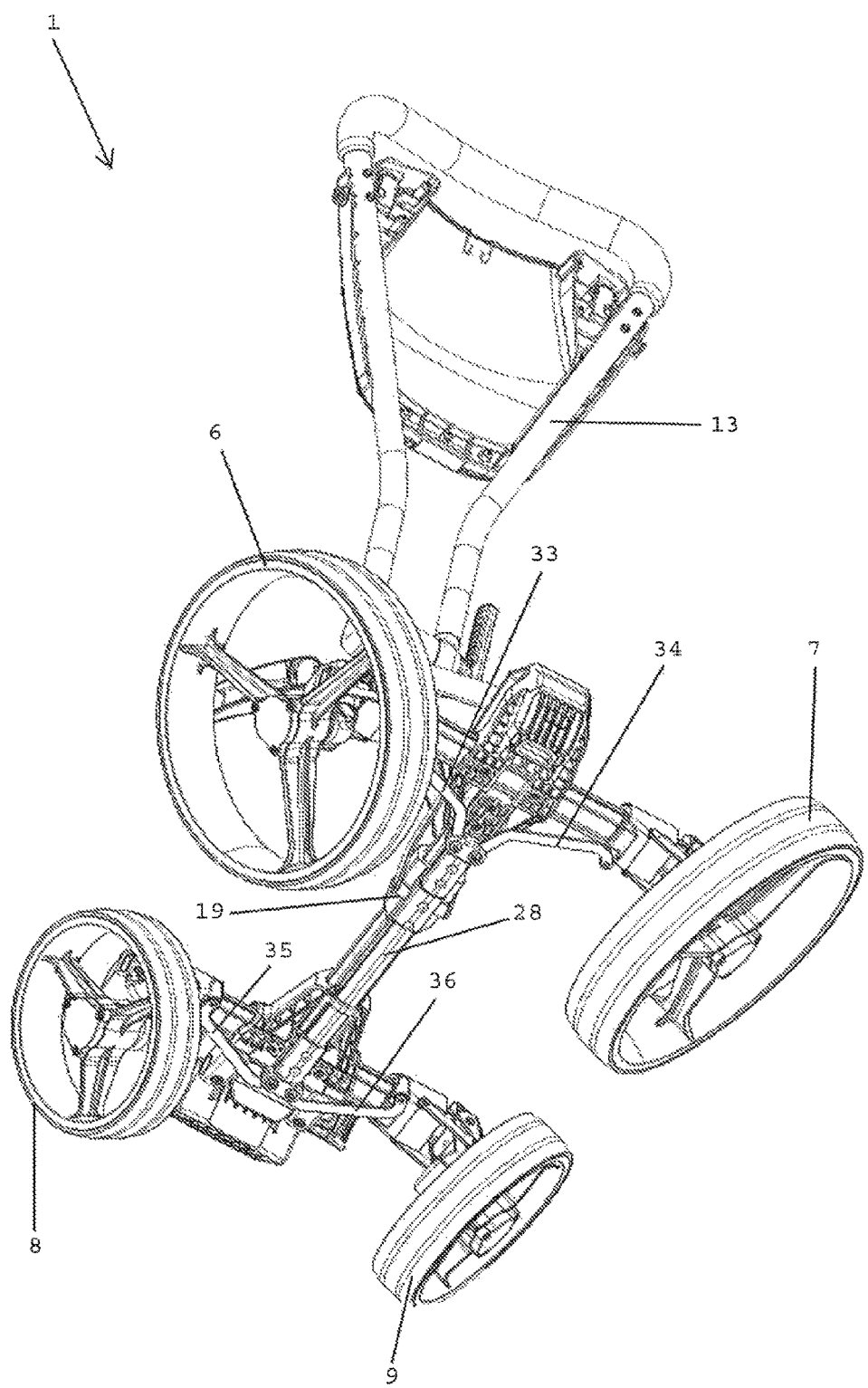

In the shown embodiment, cart 1 further comprises a folding mechanism 16 for folding first back wheel 6, second back wheel 7, first front wheel 8 and second front wheel 9 from a drive position on an underground (see FIGS. 1 to 3, 9) into a stow position (see FIGS. 7, 8) through a series of intermediary positions (see FIGS. 4 to 6). The stow position corresponds to the collapsed position of the carrier frame 10. In the shown embodiment, the folding mechanism 16 is arranged for pivoting first and second back wheels 6, 7 as well as first and second front wheels 8, 9 about horizontal axes extending in the longitudinal direction of cart 1 by approximately 90 degrees inwards.

In the shown embodiment, folding mechanism 16 comprises a first back wheel holder 17 and a second back wheel holder 18 pivotably connecting the first 6 and the second back wheel 7 to the opposite ends of the first transverse frame member 3, respectively. For this purpose, first back wheel holder 17 and second back wheel holder 18 are pivotably mounted to the first transverse frame member 3 about horizontal axes extending in longitudinal direction. Folding mechanism 16 further comprises a first slide block 19 for sliding along the longitudinal frame member 5. A first guide unit 20 connects first slide block 19 to first back wheel holder 17. A second guide unit 21 connects first slide block 19 to second back wheel holder 18. First guide unit 20 and second guide unit 21 are arranged for converting the sliding movement of first slide block 19 into pivoting movements of first 17 and second back wheel holder 18, respectively. Folding mechanism 16 further comprises a connecting member 22 which connects carrier frame 10 to first slide block 19. In the shown embodiment, connecting member 22 comprises two identical rotary arms 23, opposite ends of the rotary arms 23 being pivotably connected to the longitudinal carrier frame member 11 and the first slide block 19, respectively.

In the shown embodiment, folding mechanism 16 further comprises a first front wheel holder 24 and a second front wheel holder 25, the first front wheel holder 24 pivotably connecting the first front wheel 8 to the one end of second transverse frame member 4, the second front wheel holder 25 pivotably connecting the second front wheel 9 to the other end of second transverse frame member 4. Folding mechanism 16 further comprises a third guide unit 26 for guiding the first front wheel holder 24 and a fourth guide unit 27 for guiding the second front wheel holder 25.

In the shown embodiment, for transferring the actuating force from carrier frame 10 simultaneously to back wheels 6, 7 and front wheels 8, 9, the folding mechanism 16 further comprises a longitudinal connecting arm 28. In the shown embodiment, longitudinal connecting arm 28 connects first slide block 19 to first, second, third and fourth guide units 20, 21, 26, 27 such that pivoting the longitudinal carrier frame member 11 from carrier to collapsed position folds back and front wheels 6, 7, 8, 9 from drive to stow position.

In the shown embodiment, longitudinal connecting arm 28 is arranged essentially in parallel to the longitudinal frame member 5, at the underside thereof. Furthermore, longitudinal connecting arm 28 is linearly moveable in the longitudinal direction of cart 1 relative to longitudinal frame member 5.

In the shown embodiment, first guide unit 20 comprises a second slide block 29 for sliding along a first section of first transverse frame member 3. Second guide unit 21 comprises a third slide block 30 for sliding along a second section of first transverse frame member 3. In the same fashion, third guide unit comprises a fourth slide block 31 for sliding along a first section of second transverse frame member 4. Fourth guide unit 27 comprises a fifth slide block 32 for sliding along a second section of second transverse frame member 4.

In the shown embodiment, first guide unit 20 comprises a first pivot arm 33 connecting the first slide block 19 at the longitudinal frame member 5 to the second slide block 29 at the first transverse frame member 3. Second guide unit 20 comprises a second pivot arm 34 connecting first slide block 19 to third slide block 30. In the same fashion, third guide unit 26 comprises a third pivot arm 35 connecting a mount at the longitudinal connecting arm 28 to the fourth slide block 31 at the second transverse frame member 4. Fourth guide unit 27 comprises a fourth pivot arm 36 connecting the mount at the longitudinal connecting arm 28 to the fifth slide block 32 at the second transverse frame member 4. All of first, second, third and fourth pivot arms 33, 34, 35, 36 are essentially U-shaped in plan view.

In the shown embodiment, first guide unit 20 comprises two first swivel arms 37 connecting the second slide block 29 to the first back wheel holder. Second guide unit 21 comprises two second swivel arms 38 connecting the third slide block 30 to the second back wheel holder 18. In the same fashion, third guide unit 26 comprises two third swivel arms 39 connecting the fourth slide block 31 to the first front wheel holder 24. Fourth guide unit 27 comprises two fourth swivel arms 40 connecting the fifth slide block 32 to the second front wheel holder 25.

In the shown embodiment, a sleeve member 41 with an opening for passing the longitudinal connecting arm 28 therethrough is mounted on the bottom frame 2 in proximity to the second transverse frame member 4.

The invention claimed is:

1. A cart, comprising a bottom frame, the bottom frame having a first transverse frame member and a longitudinal frame member, a first and a second back wheel, the first and second back wheel being connected to opposite ends of the first transverse frame member, a first front wheel mounted to the bottom frame, a carrier frame mounted to the bottom frame, a collapsing mechanism for bringing the carrier frame from a carrying position into a collapsed position, and a folding mechanism for folding the first and second back wheel and the first front wheel from a drive position into a stow position, the folding mechanism having a first and a second back wheel holder pivotably connecting the first and the second back wheel about essentially horizontal axes extending in a longitudinal direction of the cart to the opposite ends of the first transverse frame member, respectively, the folding mechanism further having a first slide block for sliding along the longitudinal frame member, a first guide unit connecting the first slide block to the first back wheel holder and a second guide unit connecting the first slide block to the second back wheel holder, the folding mechanism further having a connecting member connecting the carrier frame to the first slide block, the folding mechanism further having a first front wheel holder, the first front wheel holder pivotably connecting the first front wheel about an essentially horizontal axis extending in the longitudinal direction of the cart to the bottom frame, the folding mechanism further having a third guide unit for guiding the first front wheel holder, wherein the folding mechanism further comprises a longitudinal connecting arm connecting the first slide block to the third guide unit for the first front wheel holder.

2. The cart according to claim 1, wherein the first front wheel and a second front wheel are connected to opposite ends of a second transverse frame member, the folding mechanism comprising a second front wheel holder, the first and the second front wheel holder pivotably connecting the first and the second front wheel to opposite ends of the second transverse frame member, respectively, the folding mechanism further comprising a fourth guide unit for guiding the second front wheel holder, the longitudinal connecting arm connecting the first slide block to the third and fourth guide unit, respectively.

3. The cart according to claim 1, wherein the longitudinal connecting arm of the folding mechanism is arranged essentially in parallel to the longitudinal frame member, preferably at the underside thereof, the connecting arm preferably being moveable essentially length-wise relative to the longitudinal frame member.

4. The cart according to claim 1, wherein the first guide unit comprises a second slide block for sliding along a first section of the first transverse frame member, the second guide unit comprising a third slide block for sliding along a second section of the first transverse frame member.

5. The cart according to claim 4, wherein the first guide unit comprises a first pivot arm connecting the first slide block at the longitudinal frame member to the second slide block at the first transverse frame member, the second guide unit comprising a second pivot arm connecting the first slide block at the longitudinal frame member to the third slide block at the first transverse frame member.

6. The cart according to claim 5, wherein the first guide unit comprises a first swivel arm connecting the second slide block to the first back wheel holder, the second guide unit comprising a second swivel arm connecting the third slide block to the second back wheel holder.

7. The cart according to claim 2, wherein the third guide unit comprises a fourth slide block for sliding along a first section of the second transverse frame member, the fourth guide unit comprising a fifth slide block for sliding along a second section of the second transverse frame member.

8. The cart according to claim 7, wherein the third guide unit comprises a third pivot arm connecting a mount at the longitudinal connecting arm to the fourth slide block at the second transverse frame member, the fourth guide unit comprising a fourth pivot arm connecting the mount at the longitudinal connecting arm to the fifth slide block at the second transverse frame member.

9. The cart according to claim 8, wherein the third guide unit comprises a third swivel arm connecting the fourth slide block to the first front wheel holder, the fourth guide unit comprising a fourth swivel arm connecting the fifth slide block to the second front wheel holder.

10. The cart according to claim 8, wherein at least one of the first, second, third or fourth pivot arm is essentially U-shaped.

11. The cart according to claim 1, wherein the connecting member comprises a rotary arm, opposite ends of the rotary arm being pivotably connected to the carrier frame and the first slide block, respectively.

12. The cart according to claim 1, wherein a sleeve member with an opening for passing the longitudinal connecting arm therethrough is mounted on the bottom frame, preferably adjacent the second transverse frame member.

13. The cart according to claim 1, wherein the carrier frame comprises a longitudinal carrier frame member, the longitudinal carrier frame member being pivotable about a transverse pivot axis between the carrying position and the collapsed position.

14. The cart according to claim 13, wherein a handle, in particular a push handle, is pivotably connected to the longitudinal carrier frame member.

15. The cart according to claim 1, wherein the first guide unit and the second guide unit are arranged for converting a sliding movement of the first slide block into pivoting movements of the first and second back wheel holder, respectively, so as to pivot the first and second back wheel as well as the first front wheel about horizontal axes extending in the longitudinal direction of the cart by approximately 90 degrees inwards.

16. The cart according to claim 1, wherein in the stow position, the first and the second back wheel as well as the first front wheel are arranged essentially horizontally.

17. A cart, comprising a bottom frame, the bottom frame having a first transverse frame member and a longitudinal frame member, a first and a second back wheel, the first and second back wheel being connected to opposite ends of the first transverse frame member, a first front wheel mounted to the bottom frame, a carrier frame mounted to the bottom frame, a collapsing mechanism for bringing the carrier frame from a carrying position into a collapsed position, and a folding mechanism for folding the first and second back wheel and the first front wheel from a drive position into a stow position, the folding mechanism having a first and a second back wheel holder pivotably connecting the first and the second back wheel to the opposite ends of the first transverse frame member, respectively, the folding mechanism further having a first slide block for sliding along the longitudinal frame member, a first guide unit connecting the first slide block to the first back wheel holder and a second guide unit connecting the first slide block to the second back wheel holder, the folding mechanism further having a connecting member connecting the carrier frame to the first slide block, the folding mechanism further having a first front wheel holder, the first front wheel holder pivotably connecting the first front wheel to the bottom frame, the folding mechanism further having a third guide unit for guiding the first front wheel holder, wherein the folding mechanism further comprises a longitudinal connecting arm connecting the first slide block to the third guide unit for the first front wheel holder, wherein the first front wheel and a second front wheel are connected to opposite ends of a second transverse frame member, the folding mechanism comprising a second front wheel holder, the first and the second front wheel holder pivotably connecting the first and the second front wheel to opposite ends of the second transverse frame member, respectively, the folding mechanism further comprising a fourth guide unit for guiding the second front wheel holder, the longitudinal connecting arm connecting the first slide block to the third and fourth guide unit, respectively, wherein the third guide unit comprises a fourth slide block for sliding along a first section of the second transverse frame member, the fourth guide unit comprising a fifth slide block for sliding along a second section of the second transverse frame member.

18. The cart according to claim 17, wherein the third guide unit comprises a third pivot arm connecting a mount at the longitudinal connecting arm to the fourth slide block at the second transverse frame member, the fourth guide unit comprising a fourth pivot arm connecting the mount at the longitudinal connecting arm to the fifth slide block at the second transverse frame member.

19. The cart according to claim 18, wherein the third guide unit comprises a third swivel arm connecting the fourth slide block to the first front wheel holder, the fourth guide unit comprising a fourth swivel arm connecting the fifth slide block to the second front wheel holder.

* * * * *